(12) United States Patent
Zacharias

(10) Patent No.: US 6,494,367 B1
(45) Date of Patent: Dec. 17, 2002

(54) SECURE MULTI-APPLICATION CARD SYSTEM

(76) Inventor: Ajit Kumar Zacharias, 7375 Brassfield Dr., Cumming, GA (US) 30041-8391

( * ) Notice: Subject to any disclaimer, the term of this patent is extended or adjusted under 35 U.S.C. 154(b) by 0 days.

(21) Appl. No.: 09/678,918

(22) Filed: Oct. 4, 2000

Related U.S. Application Data

(60) Provisional application No. 60/159,491, filed on Oct. 15, 1999.

(51) Int. Cl.[7] ................................................. G06K 5/00
(52) U.S. Cl. ........................ 235/382; 235/379; 235/380; 705/38
(58) Field of Search ................................. 235/382, 380, 235/379; 705/38

(56) References Cited

U.S. PATENT DOCUMENTS

| | | | |
|---|---|---|---|
| 4,443,027 A | | 4/1984 | McNeely et al. |
| 4,485,300 A | * | 11/1984 | Peirce .......................... 235/380 |
| 4,593,936 A | | 6/1986 | Opel |
| 4,700,055 A | | 10/1987 | Kashkashian, Jr. |
| 4,837,422 A | | 6/1989 | Dethloff et al. |
| 4,853,522 A | | 8/1989 | Ogasawara |
| 5,049,728 A | | 9/1991 | Rovin |
| 5,401,950 A | * | 3/1995 | Yoshida ........................ 235/487 |
| 5,497,411 A | * | 3/1996 | Pellerin ......................... 379/59 |
| 5,506,395 A | | 4/1996 | Eppley |
| 5,530,232 A | * | 6/1996 | Taylor .......................... 235/380 |
| 5,578,808 A | * | 11/1996 | Taylor .......................... 235/380 |
| 5,761,309 A | * | 6/1998 | Ohashi et al. ................. 380/25 |
| 5,770,843 A | * | 6/1998 | Rose et al. ................... 235/380 |
| 5,834,747 A | | 11/1998 | Cooper |
| 5,844,230 A | | 12/1998 | Lalonde |
| 5,859,419 A | | 1/1999 | Wynn |
| 6,144,948 A | * | 11/2000 | Walker et al. ................. 705/38 |
| 6,260,026 B1 | * | 7/2001 | Tomida et al. ................ 705/38 |

* cited by examiner

Primary Examiner—Michael G. Lee
Assistant Examiner—Seung Ho Lee

(57) ABSTRACT

A multi-application card for providing secure access to multiple card accounts. This system includes a multi-application card storing a readable identification number corresponding to the card, and a database located remotely from the card. The database correlates the identification number with a record associated with the card, and the record contains a list of card account numbers and associated indexes. The system also includes a translator that receives a transaction request including the identification number read from the multi-application card and one of the associated indexes obtained from a source other than the card. The translator then uses the received identification number to access the corresponding record in the database, and uses the received index number to retrieve the corresponding card account number and expiry date. The translator then transmits the card account number and expiry date in response to the transaction request. With this system, a cardholder can carry a single multi-application card that provides access to multiple accounts associated with different cards by using a simple index. Thus, the cardholder can use multiple credit, debit and other non-encoded, magnetically encoded, bar-coded and microprocessor based cards, without having to carry each individual card.

2 Claims, 6 Drawing Sheets

SECURE MULTI-APPLICATION CARD SYSTEM

REFERENCE TO RELATED APPLICATIONS

This patent application claims priority based on U.S. Provisional Patent Application Ser. No. 60/159,491, entitled "Supracard" filed by the same inventor on Oct. 15, 1999.

TECHNICAL FIELD

This invention relates to electronic transaction systems including credit cards, debit cards, and the like. More specifically, the invention relates to a multi-application card and associated transaction processing system for providing secure access to multiple card accounts.

BACKGROUND OF THE INVENTION

Financial institutions and commercial companies issue credit and debit cards to individuals, groups of individuals, associations and businesses. In addition, people carry a variety of other types of cards including frequent flyer cards, video club cards, library cards, insurance cards and a driver's license. A quick count of the cards in one's wallet reveals how widespread this proliferation of cards has become. Typically, consumers carry numerous cards and accept the inconvenience of bulging wallets.

Even if the annoyance of carrying multiple cards and finding the right card when needed is ignored, a greater problem remains. By carrying numerous cards, the consumer exposes himself to a greater risk of loss or theft. Canceling and replacing lost or stolen credit cards, debit cards and charge cards can create substantial stress for the cardholder. The source of this stress may reside in remembering the lost cards, finding the appropriate account numbers, informing the card issuers and awaiting the issuance of replacement cards. Unauthorized use of a stolen card before cancellation may further exacerbate the stress a cardholder experiences.

Commercial institutions have developed various techniques aimed at reducing fraudulent transactions. Financial institutions, for example, have implemented a Personal Identification Number (PIN) system. This system requires that consumers enter a PIN into an automatic teller machine (ATM) before proceeding with a transaction. While the PIN system may partially reduce fraudulent purchases for debit cards, the application of this system does not cover the broad area of retail purchases. Many charge cards and credit cards only require the PIN when using an ATM, if at all. This poses a security risk to the cardholder because anyone with a lost or stolen card can charge purchases to the card account.

A more recent solution to the security issue is the smart card. While there are various types, most smart cards include an embedded microprocessor and memory that can store substantial cardholder information. This approach supposedly provides merchants more information when deciding if the consumer is the cardholder. Like the PIN system, smart cards partially address the security issue aimed at reducing fraudulent purchases. However, other security concerns emerge such as (1) information on the smart card could be accessed by an unauthorized user (2) unauthorized users could still make purchases and (3) smart cards do not protect privacy. For example, storing information on the card enables anyone with the ability to display the contents of a card to learn information about the cardholder. Even if the smart card could be used as a multi-application card and addresses the issue of too many cards, the inherent security risks inhibit its widespread implementation.

Therefore, there is a need for a system that substantially reduces the number of cards that a cardholder must carry while increasing the security of card-based transactions.

SUMMARY OF THE INVENTION

According to a first aspect of the invention, there is provided a system allowing a single card device to be utilized in accessing a plurality of applications. The system comprises a card processing system, a card reader communicatively coupleable to the card processing system, the card reader being operative to read a data identification number from the single card device and to receive an index number selected by a user of the card device through a data interface. The processing system, in response to receiving the data identification number and the index number from the card reader is operative to identify an account number associated with the data identification number and the index number when the index number is within a first subset of index numbers chosen by an authorized holder of the card device from a domain of potential index numbers. The system is also operative to disable the card device from further use when the index number is within a second subset of index numbers chosen by the authorized holder of the card device from the domain of potential index numbers. The system can also re-enable a disabled card device when the index is within a third subset of index numbers chosen by the authorized holder from the domain of potential index numbers.

According to a further aspect of the invention, there is provided a method allowing a single card device to be utilized in accessing a plurality of applications. The method includes reading a data identification number from the single card device and receiving an index number selected by a user of the card device through a data interface. The method identifies an account number associated with the data identification number and the index number when the index number is within a first subset of index numbers chosen by an authorized holder of the card device from a domain of potential index numbers. The method also disables the card device from further use when the index number is within a second subset of index numbers chosen by the authorized holder of the card device from the domain of potential index numbers and re-enables a disabled card device when the index number is within a third subset of index numbers chosen by the authorized holder from the domain of potential index numbers.

The present invention meets the needs described above in a secure multi-application card system. With this system, consumers experience additional convenience by replacing numerous cards with a single multi-application card. This replacement can result in saving time by eliminating the search for the "right" card. Using the multi-application card also reduces the space needed by consumers for card storage. With the invented system, a cardholder can carry a single multi-application card, referred to as a "Supracard," and using a simple index, access and invoke the use of multiple cards issued by multiple issuers and serving multiple purposes. Thus, the cardholder can use multiple credit, debit and other non-encoded, magnetically-encoded, bar-coded and microprocessor based cards without having to carry each individual card.

The present invention also provides secure access to one or more card accounts. By storing the cardholder's record in a location remote from the multi-application card, the invention removes relevant account information, such as account number and expiration date, from easy access by an unauthorized user. To further increase security, the remote database may not contain personal identification numbers of the stored cards. As a result, potential hackers of the database still may not get information needed to use the cards. The invention also includes a lock feature where the multi-application card may be automatically locked from future transactions in the event of predefined actions. As a further advantage, cardholder may purposefully lock the card to prevent future transactions.

Generally described, the invention includes a multi-application card for providing secure access to multiple cards and accounts. The multi-application card stores a readable identification number that corresponds to the card. The invention also includes a database located remotely from the card. The database correlates the identification number with a record associated with the card. The record contains a list of card types, card numbers and expiry dates in positions relative to their associated indexes. The invention also includes a translator that receives a transaction request, which includes the identification number read from the multi-application card and an index obtained from a source other than the multi-application card. The translator then uses the received identification number to access the corresponding record in the database, and uses the received index to retrieve the corresponding card account number and expiry date. The translator then transmits the card account number and expiry date to the originator of the transaction request.

In view of the foregoing, it will be appreciated that the secure multi-application card system improves over the drawbacks of prior systems. The specific techniques and structures employed by the invention to improve over the drawbacks of the prior systems and accomplish the advantages described above will become apparent from the following detailed description of the embodiments of the invention and the appended drawings and claims.

DETAILED DESCRIPTION OF THE EMBODIMENTS

Figure 1:
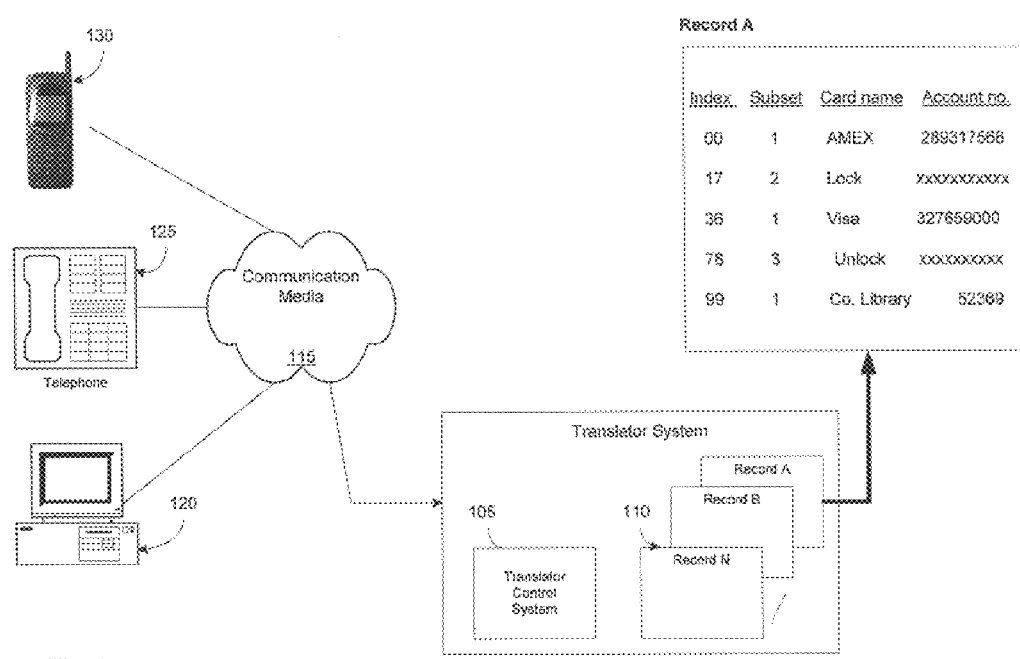
FIG. 1 is a diagram illustrating the creation and maintenance of a record for a multi-application card according to the present invention, which is explained in greater detail with reference to FIGS. 2–6.

The present invention may be embodied in a method and system for increasing the security of card-based transactions using a multi-application card, referred to hereinafter as a Supracard, to access one or more conventional card(s) issued by one or more card issuer(s). The term "Supracard number", as used herein, generally refers to the number assigned to the multi-application card. The term "index", as used herein, generally refers to a code pointing to a specific entry within a list of card information entries pertaining to a Supracard Number. The term "card account number", as used herein, generally refers to the account number or reference number pertaining to a card whose parameters are stored in the database by the Supracard cardholder. Consequently, "card account numbers" may include accounts related to credit cards, debit cards, charge cards, insurance cards, library cards, driver's license and any other cards, whether they are non-encoded, magnetically encoded, barcoded or microprocessor-based cards. The terms "he", "him" and "his" have been used in place of "he/she", "him/her" and "his/her".

This system provides security and convenience in processing credit and debit cards and verifying the identity of a cardholder. With this system, a cardholder may carry a single multi-application card, a Supracard, yet have use of all his/her other cards by using a simple index number. Thus, the cardholder can use credit, debit and identity cards without having to carry them. The invention encompasses communicatively connected computer systems, including hardware, software and a database.

The Supracard system is a network of subsystems serving multiple applications. There are four types of subsystems. The first type of subsystem is the client subsystem. This is typically the point of use of the Supracard, and is designed for the application. It includes the capability to read a card and a means to enter data. In a retail environment it would typically be at a merchant's point of sale or service, In an airline it could be a flight check-in location where a frequent flyer number is used. In a medical environment it could be at a doctor's office or laboratory or hospital. In transportation, it could be at a driver's license bureau or in a police cruiser.

The second type of subsystem is the card issuer subsystem. This could be a bank system that processes credit or debit cards, such as Visa, Mastercard, American Express, Discover or other financial institution. Another example would be an airline system that issues and tracks frequent flyer points, or a Government agency that issues driver's licenses, etc.

The third type of subsystem is the card processor subsystem. These are systems for convenience in communicating with multiple card issuer systems. Typically, client subsystems communicate with card processor systems to avoid having to establish links with each individual card issuer system.

The fourth is the card translator subsystem, which manages the database of Supracard information. The database is also referred to as the card translator database.

In the following description the terms "subsystem" and "system" may be used synonymously, since a Supracard subsystem is typically an independent system.

The typical Supracard has the look and feel of a standard credit-card. It may be non-encoded, magnetically encoded or microprocessor-based. In an additional embodiment, it may also have a bar code. The visible information on the card may include the cardholder's name, a photograph of the cardholder, a Supracard identification number and a bar code. The magnetic stripe contains the Supracard. Number and conforms to the specifications of standards bodies such as, the American Bankers Association (ABA) and the American National Standards Institute (ANSI). The magnetic information is recorded to enable it to be read by a standard credit card reader. The bar code allows it to be read by a bar code reader.

The Supracard could be conceptually described as a "card of cards." In the hierarchical system described herein, the Supracard is a primary card. All other cards (Visa, Mastercard, American Express, club membership cards, insurance card, driver's license, etc.) are referred to as sub-cards. Sub-card information including at least type, card account number and expiration date, pertaining to each of the sub-cards is stored in a computer database. The Supracard number serves as the key to the record within the database where information on its associated sub-cards is stored. The combination of the Supracard number and a cardholder-selected index, is used to locate individual sub-card information. Each Supracard has its own PIN code.

Sub-cards could include credit cards, debit cards, department and specialty store cards, library cards, club membership cards, health insurance cards, and any other card, including smart cards and other microprocessor based cards. Each of these sub-cards may or may not have PINs associated with them. The PINs of the sub-cards are not required to be stored in the Supracard database or used by the system. The Supracard system aids in processing card-based transactions by providing sub-card information in response to authorized inquiries.

Consumers wishing to use a Supracard would sign up for the service operated by a licensed Card Translator. Each customer would be assigned a Supracard number and a PIN code, and be issued a Supracard. In the preferred embodiment, each Supracard holder will be issued at least two Supracards.

Supracard holders may enter and/or update their sub-card details in the Card Translator database, assigning a different index number to each one. They could do this using a data entry device such as a computer, a telephone keypad or other wireless device, and the Internet or some other telecommunications media. If Supracard cardholders prefer, they may simply provide details to authorized Card Translator personnel and have them enter and maintain the sub-card information. Supracard holders may also designate one or more indexes as "Lock" indexes. If the Supracard is used with an index designated as a "Lock" index, access to pre-selected or all sub-card information will be locked. The lock may be removed by entering an index designated as an "Unlock" index.

The Supracard is a multi-application card. The following is a description of how it may be used for the purchase of goods or services. At the time of purchase, if a consumer presents a Visa or Mastercard (or any credit, debit or identity card other than a Supracard), the charge authorization transaction is sent by the client subsystem at the merchant location, received by a card processor's system and, based on the card Issuer Identification Number (IIN, part of the card number) routed to the proper bank/financial institution's system for approval. However, if the IIN shows that it is a multi-application card, the card processor's system recognizes that it needs the application-specific card number. If an index is not entered, the user will be prompted for the index. The card processor's system receives the index selected by the user, retains any sub-card PIN entered, and sends the Supracard number and the index to the card translator system. The card translator, using the Supracard number and the index, retrieves the selected card account number and expiration date from its database of pre-stored information, and sends them to the card processor's system.

Using the actual card account number and expiration date (together with any entered PIN), the card processor's system routes the transaction to the; appropriate bank/financial institution's system for approval or denial. When the card processor's system receives a response to the transaction from the bank/financial institution, it sends it to the client system requesting authorization.

Credits and adjustment transactions may be similarly handled. To avoid substantial repetition, they are not described.

In the preceding example, the client system communicates with and uses a card processor as an intermediary between the client system and the translator. In an alternative embodiment, the client system may communicate directly with the card translator, avoiding the need for the card processor in the Supracard number translation process.

The following is a description of how the Supracard may be used at an Automated Teller Machine (ATM). In the case of an ATM transaction, when a consumer uses a conventional Bankcard, the transaction follows its standard operating procedure. However, if the card used at the ATM is a Supracard, the Bankcard system would detect that the card used is a multi-application card. The user is prompted to enter the index pertaining to the selected Bankcard. The Bankcard system receives the index entered by the user, and sends the Supracard number and: the index to the card translator system. The card translator, using the Supracard number and the index, retrieves the selected card account number (in this case, the Bankcard number), and expiration date from its database of pre-stored information, and sends them to the Bankcard system. Using the actual Bankcard number and expiration date, the Bankcard system processes the transaction as it would normally.

From a security aspect, an unauthorized Supracard user will not know what cards are registered on the Supracard, or the index codes to use them. Three false entries and the Supracard could be locked. A thief may also lock the card by unknowingly entering an index preset to "Lock" the card. In this case, the legitimate cardholder will not have to go through the laborious process of canceling all cards. Whether the Supracard is stolen or just lost, a spare Supracard will allow the user to instantly change the Supracard record, use the spare, and disable the missing card.

Referring now to the drawings in which like numerals indicate like elements throughout several figures, FIG. 1 illustrates creation and maintenance of a record for a multi-application card, or Supracard, according to the present invention. At the time the Supracard record is created, a Supracard representative uses the Translator control system 105 to complete setup tasks. These tasks may include ordering a Supracard, assigning a Supracard number and PIN, storing acquired cardholder information, creating a cardholder record 110 and storing a cardholder-selected login ID and password.

After creating the Supracard record, the Supracard representative may inform the cardholder that the record has been created. Thereafter, the cardholder may access his record 110 using any one of many communication devices, three of which are illustrated in FIG. 1. For example, a cardholder may connect to, and interact with, the Translator system through the communication media 115 using a computer 120, and modify his record. Alternatively, the cardholder may interact with the card translator system and modify his record using a data entry device such as the keypad of a telephone 125 or wireless device 130.

Before allowing the cardholder access to his record, the Translator control system 105 may request additional information. For example, the Translator control system 105 may require that the cardholder enter his login ID and password as previously defined. After authenticating the cardholder's identity, the system may permit the cardholder access to his record. The cardholder may add, modify or delete cards in his record, and assign lock and unlock codes to selected index codes in his Supracard record in the database. For example, the cardholder may increase security by assigning all indexes between 20 and 50 as lock codes to increase the chance that a thief may use one of them and lock the card.

Alternatively, the cardholder may speak with and have a Translator system representative modify the cardholder's record using a computer or terminal connected to the Translator control system 105.

Each cardholder record 110 includes an index table with entries relating to the corresponding cardholder's cards. While a record may include multiple cards, the invention is equally applicable to a single card record. As shown in the exploded view of Record "A" shown in FIG. 1, entry 00 corresponds to the cardholder's American Express card with account number 289317568. Similarly, entries 36 and 99 correspond to the cardholder's VISA card with account number 327659000 and county library card with account number 52369, respectively. Although not shown, in addition to the Card Name and Account No., entries may contain expiry date, card types and other information pertaining to the sub-card. Typically, the index code corresponds to a two-digit number ranging from 00 to 99 selected by the cardholder. Alternative embodiments may include index codes of more or less digits or alphanumeric codes. All of the index numbers that represent particular cards of the cardholder can be considered a first subset (1) of the domain of potential index numbers.

Entries 17 and 78 of Record A correspond respectively to lock and unlock indexes that add security as explained with reference to FIG. 2. Use of the lock index disables the process of future transactions on the associated Supracard. In contrast, the unlock index can return the Supracard to a state that re-enables the process of future transactions. All of the index numbers that result in the card device of the invention being disabled from further use can be considered a second subset (2) of the domain of potential index numbers. Similarly, the index numbers that result in the Supracard being re-enabled can be considered a third subset (3) of this domain. In an alternative embodiment, the Translator control system 105 may disable the process of future transactions after processing a designated number of erroneous index codes. In an alternative embodiment, the cardholder may purposefully invoke the lock and unlock features by selecting the corresponding index codes.

Figure 2:
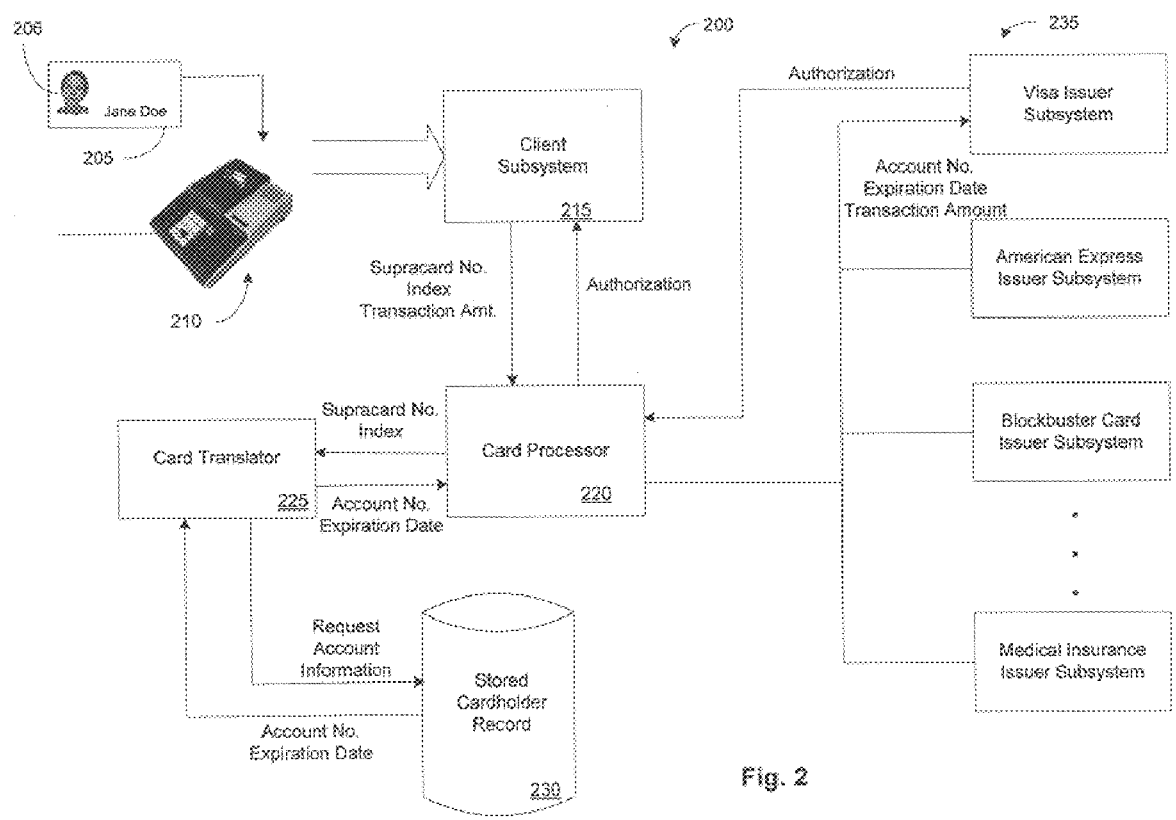
FIG. 2 is a functional block diagram illustrating increased security of a multi-application card, wherein the client system employs a card processor as an intermediary between the client system and the card translator system.

FIG. 2 is a functional block diagram illustrating a system 200 for increasing the security of card-based transactions using a multi-application Supracard 205. In this embodiment, a card processor 220 serves as an intermediary between the client subsystem 215, the card translator 225, and the card issuer subsystems 235. The Supracard 205 can replace various types of consumer cards including discount grocery cards, library cards, video rental cards, credit cards and debit cards. Each Supracard number corresponds to a cardholder record 110 as explained with reference to FIG. 1. The Supracard 205 may include a magnetic stripe with the Supracard number encoded. Alternatively, the Supracard 205 may include a bar coded version of the Supracard number. The Supracard 205 may also include a picture 206 of the consumer.

To begin a transaction, a user of the client system may scan the Supracard 205 using a card reader 210. By scanning the Supracard 205, the operator retrieves the Supracard number. The Supracard user is prompted to enter, and enters, the index of the card he/she desires. Typically, only the cardholder knows the correct index for each sub-card as defined in the cardholder record 110. As described with reference to FIG. 1, the cardholder records include lock and unlock indexes.

When a user enters an index pertaining to a lock code, it begins a series of actions that denies the operator access to the desired, or any, account number. In addition, the client system 215 may receive an authorization denial if the user enters erroneous indexes a predefined number of times even if the entered indexes do not pertain to lock codes. A locked Supracard 205 may be unlocked by processing an unlock transaction. Consequently, the lock feature increases security with the multi-application Supracard 205. For example, a cardholder who loses his Supracard 205 can quickly lock it. If an unauthorized user attempts to use a Supracard 205 before the cardowner realizes his Supracard is lost, the user's guessing at an index may also result in locking the card.

The client subsystem 215 receives the Supracard number and the index from the card scanner/data entry device 210. In an additional embodiment, the card reader and the data entry means may be separate devices. The client subsystem 215 manages the client's request for authorization from the card issuer 235. Specifically, client subsystem 215 transmits the Supracard number and index to a card processor 220, and receives a response from the card processor 220. One skilled in the art will appreciate that the transaction process may vary depending on the type of card transaction.

The card processor 220 serves as a liaison between the client 215, the card translator 225 and card issuer 235 in the authorization process. The card processor 220 contacts the card issuer 235 on behalf of the client 215. In a conventional credit card transaction, the card processor 220 simply contacts the card issuer 235 for authorization. When a Supracard is used, the card processor 220 recognizes the need to retrieve the specific card account number; the card processor 220 forwards the Supracard number and index to the card translator 225.

Upon receiving the Supracard number and index from the card processor 220, the card translator 225 identifies the cardholder record corresponding to the Supracard number. After identifying the appropriate cardholder record, the card translator 225 requests the account information corresponding to the received index from the database 230. In an alternative embodiment, the database 230 may include the logic that correlates the Supracard number to a record. In response, the database 230 returns the sub-card account number and expiration date to the card translator 225. The card translator 225 forwards the received sub-card account number and expiration date to the card processor 220.

When the index entered by the user corresponds to a lock index, the database 230 may return a predefined message indicating that the index entered is invalid. As a result, the card translator 225 may designate the cardholder record as locked and transmit an "invalid code" message to the card processor 220. In addition, the card translator 225 may deny future requests for the associated Supracard number until the cardholder unlocks the card. The cardholder may unlock the Supracard 205 as explained with reference to FIG. 1.

If the card processor 220 does not receive the account number and expiration date from the card translator 225, the card processor 220 may transmit a transaction denial to the client 215. This avoids the card processor 220 involving the card issuer 235 should the user enter an invalid index. Thus, fraudulent use of a card may be denied quickly without involving the card issuer 235.

After receiving the account number and expiration date from the card translator 225, the card processor 220 transmits this information along with other transaction-relevant information to the appropriate card issuer subsystem 235. One skilled in the art will appreciate card processor 220 may also forward a PIN it may have received from the client subsystem 215. The card issuer subsystem 235 reviews the received information and returns either an authorization or denial. The card processor 220 forwards the authorization or denial to the client subsystem 215. The client subsystem 215 proceeds with the transaction accordingly.

The system 200 increases the security of card-based transactions by using the Supracard 205 in combination with the card translator 225 and database 230. In alternative embodiments, the function of these devices may be housed in client subsystem 215, card issuer subsystem 235, Bankcard system (not shown) or card processor 220. While FIG. 2 illustrates the implementation of the present invention with card-based purchases or rentals, the invention may also be used: with refund transactions, automated teller machines and other applications involving card-based transactions.

Figure 3:
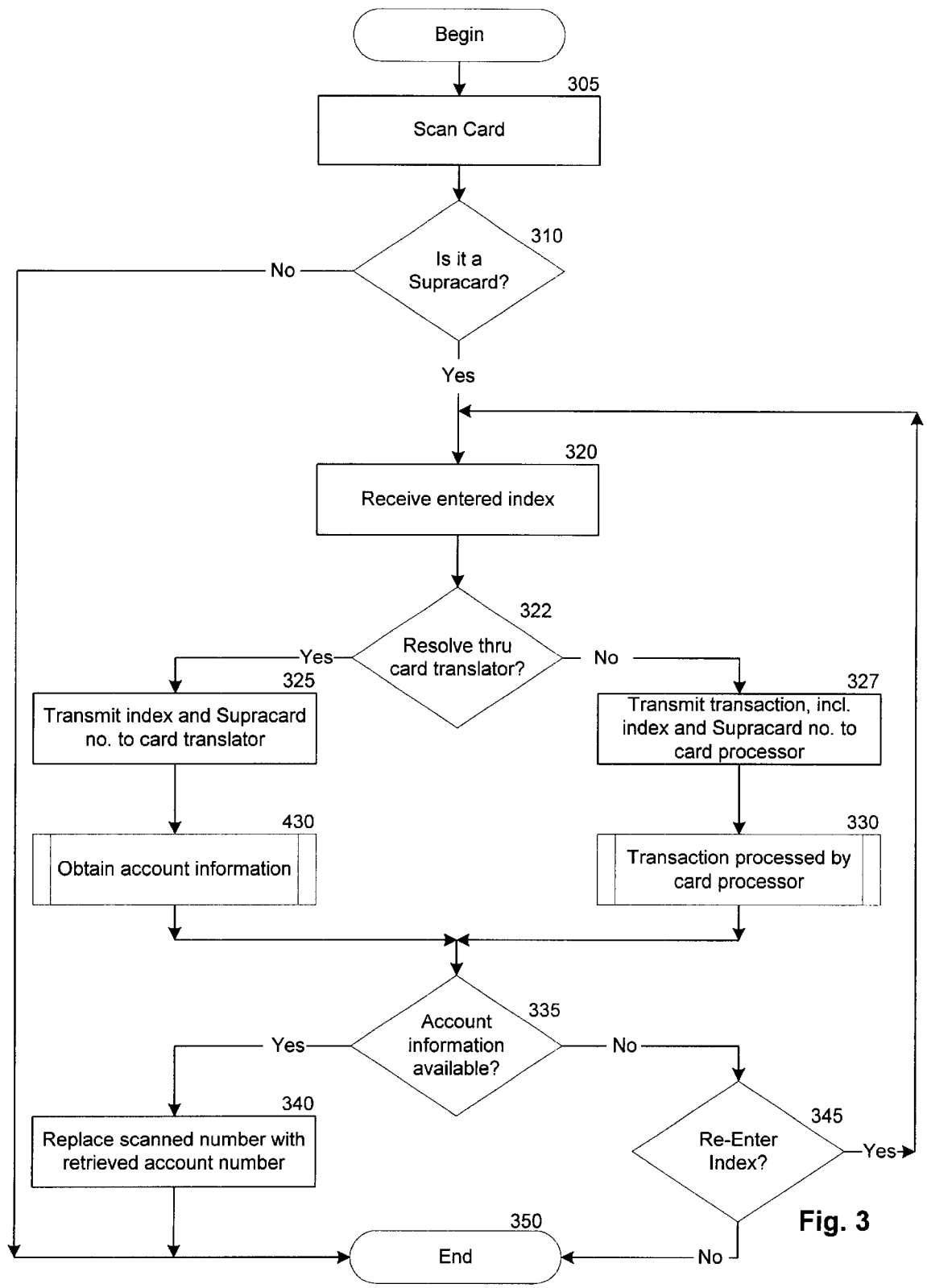
FIG. 3 is a logic flow diagram illustrating a method for processing card-based transactions using a multi-application card illustrated in FIG. 2.

FIG. 3 is a logic flow diagram illustrating a method for processing card-based transactions with increased security using the Supracard 205 illustrated in FIG. 2. In step 305, a client scans the Supracard 205 for the Supracard number. Though not shown, the client completes the step 305 after the user requests a service or goods purchase. Step 305 is followed by step 310, in which the client subsystem 215 determines that the received card number corresponds to a Supracard. One skilled in the art will appreciate that a Supracard may be identified by its number. If in step 310, the client subsystem 215 determines that the card number received does not correspond to a Supracard, the "NO" branch is followed from step 310 to the "END" step 350, to process a conventional card transaction.

If in step 310, the client subsystem 215 determines that the card number received does correspond to a Supracard, the "YES" branch is followed from step 310 to step 320, in which the client subsystem 215 receives the index code entered by the user. Generally, the number entered by the user in this step is assumed to be the index even if the format is improper. For example, a fraudulent consumer may enter a four-digit number he suspects as the PIN number. In an alternative embodiment, the index may be entered in combination with the PIN number for the account number to be used.

Step 320 is followed by step 322, in which the client subsystem 215 determines if the translation of the number should be done through the card processor or directly with the card translator.

If in step 322, the client subsystem 215 determines that the card number translation should be performed through the card processor 220, the "NO" branch is followed from step 322 to step 327, in which the client subsystem 215 transmits the entered index and Supracard number to the card processor 220. When the client subsystem 215 transmits the Supracard number and the index to the card processor 220, it may also transmit additional transaction-relevant information. Step 327 is followed by subroutine 330, in which card processor 220 obtains account information from card translator 225 before forwarding the transaction to the appropriate card issuer 235. Subroutine 330 will be described in greater detail with reference to FIG. 4. Subroutine 330 is followed by step 335, in which the client subsystem 215 determines if the card translator 225 returned the desired account information.

If in step 322, the client subsystem 215 determines that the card number translation should be performed directly through the card translator 225, the "YES" branch is followed from step 322 to step 325, in which the client subsystem 215 transmits the entered index and Supracard number to the card translator 225. Step 325 is followed by subroutine 430, in which card translator 225 obtains account information from card database 230. Subroutine 430 will be described in greater detail with reference to FIG. 5. Subroutine 430 is followed by step 335, in which the client subsystem 215 determines if the card translator 225 returned the desired account information.

In step 335, the client subsystem 215 determines if the card translator 225 returned the required account information. If in step 335, the client subsystem 215 determines that the account information was not received, the "NO" branch is followed from step 335 to step 345, in which the client subsystem 215 determines if the index may be re-entered. If in step 345, the client subsystem 215 determines that the index may be reentered, the "YES" branch is followed from step 345 to step 320. If in step 340, the client subsystem 215 determines that the index may not be re-entered, the "NO" branch is followed from step 345 to step 350, which is the "END" step.

If in step 335, the client subsystem 215 determines that the account information was received, the "YES" branch is followed from step 335 to step 340, in which the client subsystem 215 replaces the scanned Supracard number with the account number and expiry date received from the card translator 225. Step 340 is followed by step 350, which is the "END" step.

Figure 4:
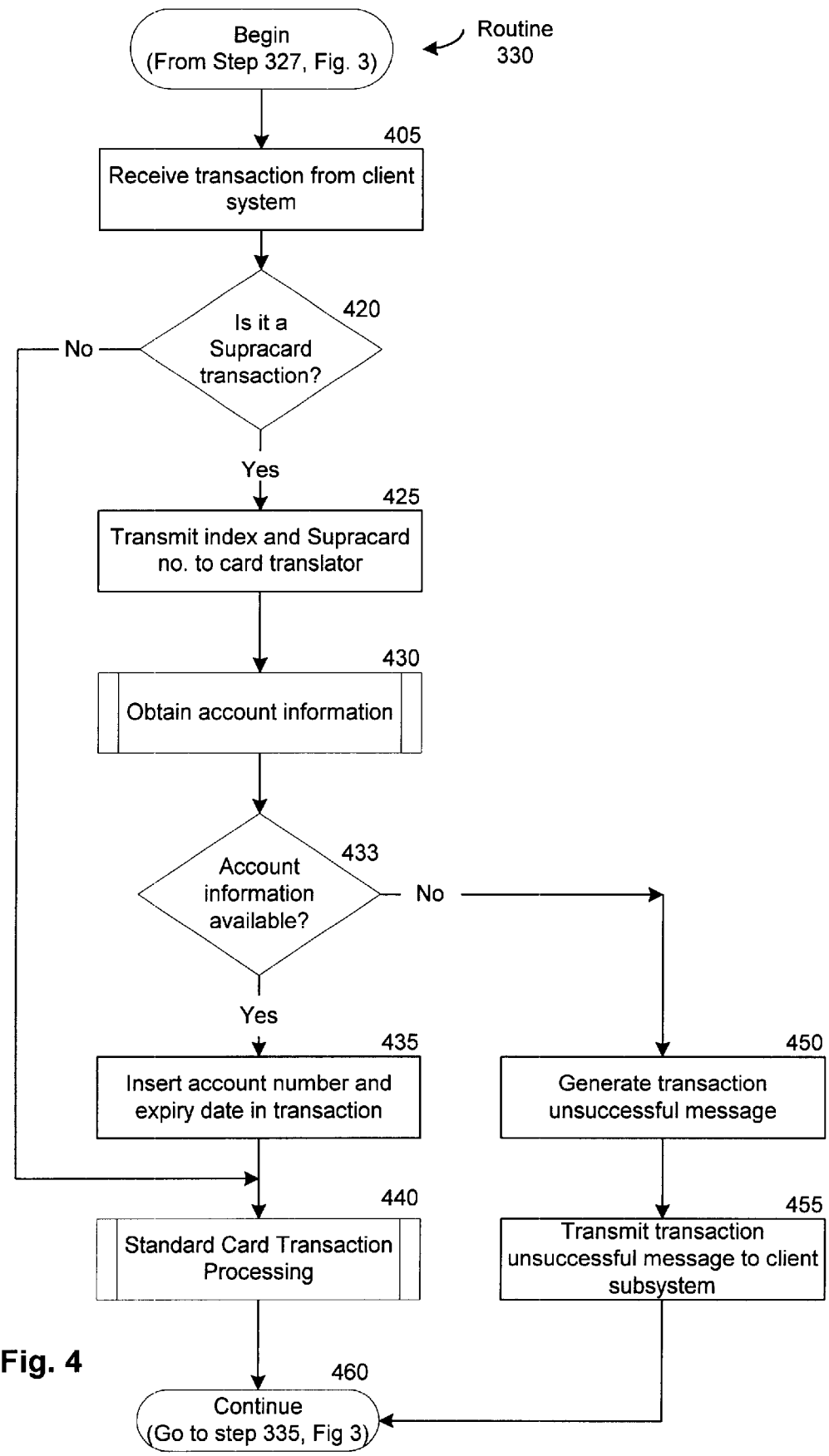
FIG. 4 is a logic flow diagram illustrating a method used by a card processor for processing card-based transactions using a multi-application card illustrated in FIG. 2.

FIG. 4 is a logic flow diagram of subroutine 330, illustrating a method for a card processor 220 to obtain account information for processing a card-based transaction, when a Supracard 205 is used at a client system 215 as illustrated in FIG. 3. Subroutine 330 begins from step 327 shown on FIG. 3. In step 405, the card processor 220 receives a transaction from a client system 215. Step 405 is followed,by step 420, in which the card processor 220 determines if the received card number corresponds to a Supracard. If in step 420, the card processor 220 determines that the card number received does not correspond to a Supracard, the "NO" branch is followed from step 420 to step 440, to process a conventional card transaction. Step 440 is followed by the "CONTINUE" step 460, in which the subroutine 330 returns to step 335 shown on FIG. 3.

If, in step 420, the card processor 220 determines that the card number received corresponds to a Supracard, the "YES" branch is followed from step 420 to step 425, in which the card processor 220 transmits the Supracard number and entered index to the card translator 225. Step 425 is followed by subroutine 430, in which card translator 225 obtains account information corresponding to the Supracard number and index sent to card translator 225 by the card processor 220. Subroutine 430 will be described in greater detail with reference to FIG. 5.

Subroutine 430 is followed by step 433, in which the card processor 220 determines if it retrieved a valid account number. If, in processing subroutine 430, the card processor 220 did retrieve a valid account number, the "YES" branch is followed from step 433 to step 435. In step 435, the card processor 220 replaces the Supracard number in the transaction received from the client subsystem 215 with the account number received from the card translator 225. Step 435 is followed by subroutine 440, which represents standard processing of conventional card transactions by the card processor 220. Subroutine 440 is therefore not described. Step 440 is followed by the "CONTINUE" step 460, in which the subroutine 330 returns to step 335 shown on FIG. 3.

If, in step 433, the card processor 220 determines that it did not receive valid account information, the "NO" branch is followed from step 433 to step 450, in which card processor 220 generates a "transaction unsuccessful" message. Step 450 is followed by step 455, in which the card translator sends the "transaction unsuccessful" message to the client subsystem 215. Step 455 is followed by the "CONTINUE" step 460, in which the subroutine 330 returns to step 335 shown on FIG. 3.

Although not described, the card issuer 235 may also request Supracard number translation by the card translator 225, invoking subroutine 430.

Figure 5:
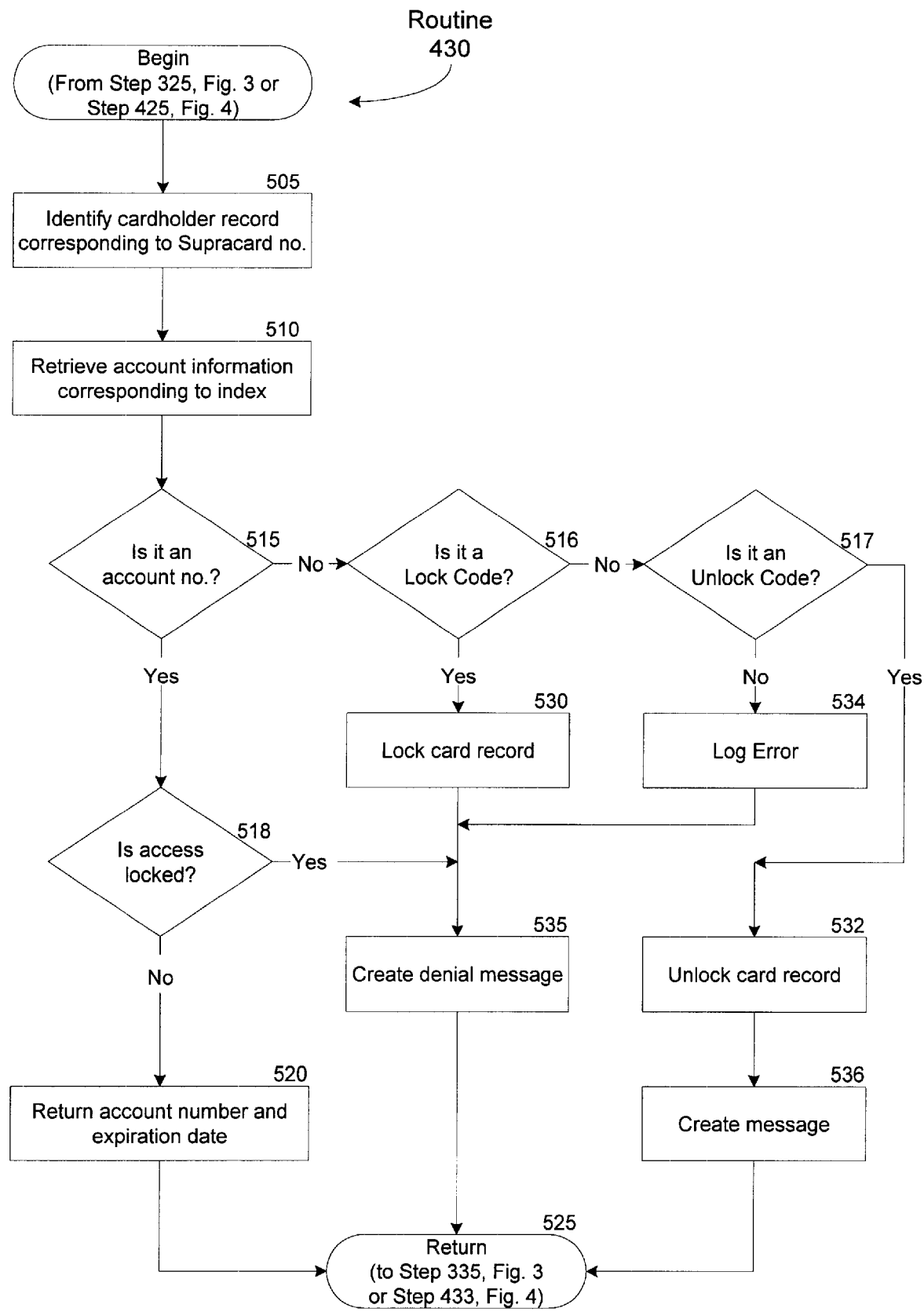
FIG. 5 is a logic flow diagram illustrating a subroutine for obtaining specific account information for the methods illustrated in FIGS. 3 and 4.

FIG. 5 is a logic flow diagram illustrating a subroutine 430 for obtaining account information for the methods illustrated in FIGS. 4 and 5. Subroutine 430 begins from step 325 shown on FIG. 3 and step 425 shown on FIG. 4. In step 505, the card translator 225 identifies the cardholder record 110 corresponding to the scanned Supracard number. To identify the appropriate cardholder record, the card translator 225 may utilize "look-up" tables. Step 505 is followed by step 510, in which the card translator 225 retrieves account information from the database 230. This retrieval may include the step of identifying the sub-card corresponding to the index. The account information may include the expiration date and account number.

Step 510 is followed by step 515, in which the card translator 225 determines if it retrieved the desired account number. As described with reference to FIG. 3, a fraudulent user may enter an index not defined by the cardholder or a lock/unlock index. By completing step 510, the card translator 225 may implicitly identify the validity of the index entered by the user. If in step 510, the card translator 225 retrieved the account number, the "YES" branch is followed from step 515 to step 518. In step 518, the card translator 225 determines if the cardholder record 110 was previously locked. If the card translator 225 determines that the cardholder record 110 was previously locked, the "YES" branch is followed from step 518 to step 535, in which the card translator returns a denial message to the subsystem that invoked subroutine 430. One skilled in the art will appreciate that subroutine 430 may be invoked from a client subsystem 215, a card issuer subsystem 235 or a card processor subsystem 220. Step 535 is followed by the "CONTINUE" step 525, in which the subroutine 430 returns to step 335 shown on FIG. 3 or step 433 shown on FIG. 4, whichever invoked subroutine 430.

If in step 518, the card translator 225 determines that the cardholder record 110 was not previously locked, the "NO" branch is followed from step 518 to step 520, in which the card translator 225 returns the account number and expiration date to the subsystem which invoked subroutine 430. Step 520 is followed by the "CONTINUE" step 525, in which the subroutine 430 returns to step 335 shown on FIG. 3 or step 433 shown on FIG. 4, whichever invoked subroutine 430.

If, in step 515, the card translator 225 determines that the index entered by the user does not correspond to an account number, the "NO" branch is followed from step 515 to step 516. Following the "NO" branch indicates that the index entered by the user is either not defined by the cardholder or corresponds to a lock/unlock index. In step 516, the card translator 225 determines if the index corresponds to a lock index. If, in step 516, the card translator 225 determines that the index entered corresponds to a lock index, the "YES" branch is followed from step 516 to step 530, in which card translator 225 updates the cardholder record to disable access to contents of cardholder record 110 to future transactions until the cardholder record 110 is unlocked. One skilled in the art will appreciate that card translator 225 may store this update in a status field. Updating the cardholder record may also include generating a denial message. Step 530 is followed by step 535, in which the card translator sends a denial message to the subsystem which invoked subroutine 430. Step 535 is followed by the "CONTINUE" step 525, in which the subroutine 430 returns to step 335 shown on FIG. 3 or step 433 shown on FIG. 4, whichever invoked subroutine 430.

If, in step 516, the card translator 225 determines that the entered index does not correspond to a lock index, the "NO" branch is followed from step 516 to step 517. Following the "NO" branch indicates that the index entered by the user is either not defined by the cardholder or corresponds to an unlock index. In step 517, the card translator 225 determines if the index corresponds to an unlock index. If, in step 517, the card translator 225 determines that the index entered corresponds to an unlock index, the "YES" branch is followed from step 517 to step 532, in which card translator 225 updates the cardholder record 110 to enable access to the contents of the record for subsequent transactions. The card translator 225 may store this update in a status field. Updating the cardholder record may also include generating a successful completion message. Step 532 is followed by step 536, in which the card translator sends a successful completion message to the subsystem that invoked subroutine 430. Step 536 is followed by the "CONTINUE" step 525, in which the subroutine 430 returns to step 335 shown on FIG. 3 or step 433 shown on FIG. 4, whichever invoked subroutine 430.

If, in step 517, the card translator 225 determines that the entered index does not correspond to an unlock index, the "NO" branch is followed from step 517 to step 534. Following the "NO" branch indicates that the index entered by the user is erroneous. Consequently, the card translator 225 updates the cardholder record to reflect this situation. One skilled in the art will appreciate that card translator 225 may store this update in a count field. Updating the cardholder record may also include generating a denial message. Step 534 is followed by step 535, in which the card translator sends a denial message to the subsystem which invoked subroutine 430. Step 535 is followed by the "CONTINUE" step 525, in which the subroutine 430 returns to step 335 shown on FIG. 3 or step 433 shown on FIG. 4, whichever invoked subroutine 430.

Figure 6:
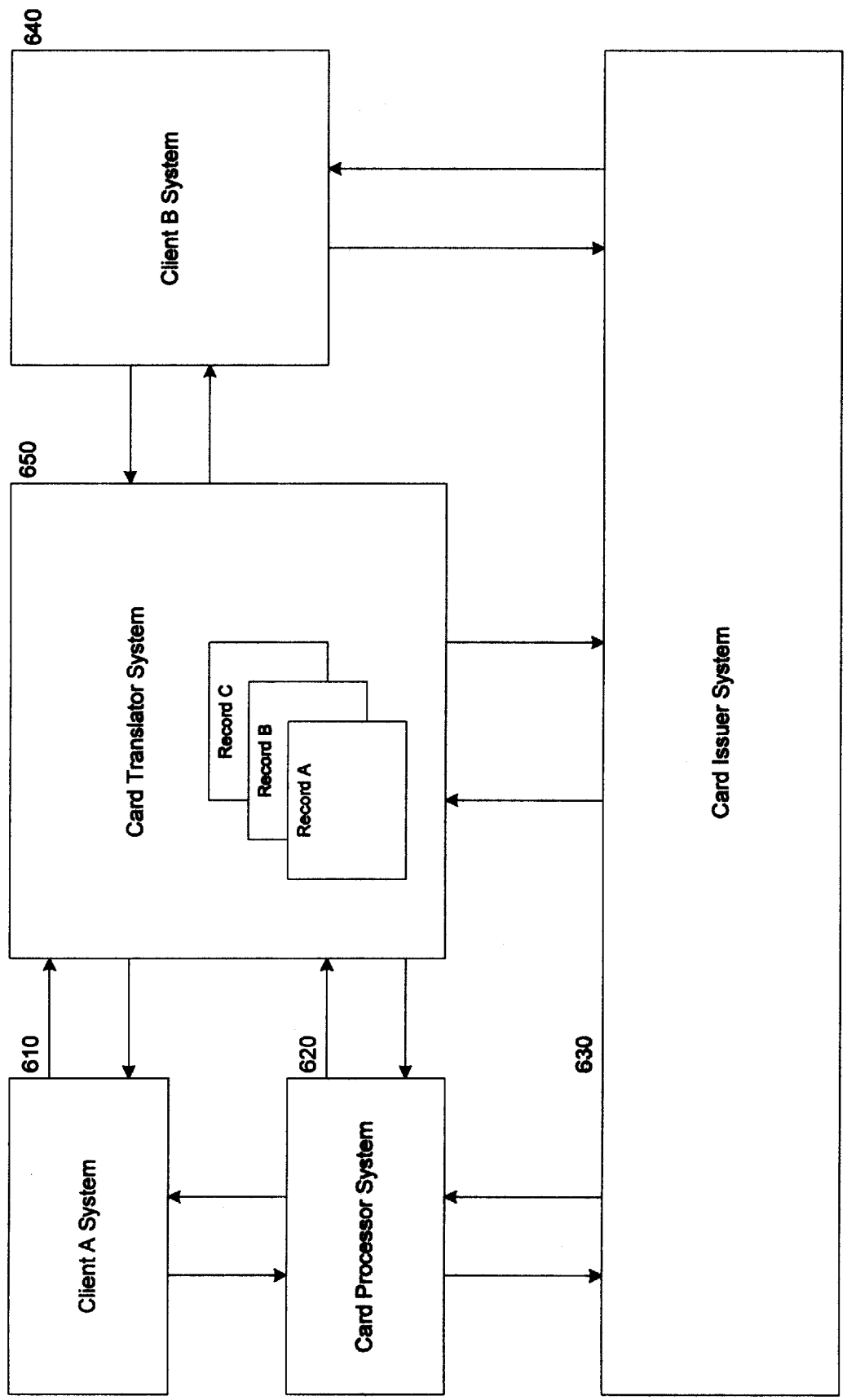
FIG. 6 is a block diagram illustrating alternate embodiments for processing card-based transactions using the multi-application card illustrated in FIG. 2.

FIG. 6 is a block diagram illustrating alternative embodiments when processing card-based transactions using the Supracard 205 illustrated in FIG. 2. Two client systems are shown. Client A system 610 uses an intermediary card processor 620 to communicate with card issuer system 630. Client B system 640 does not use an intermediary card processor but communicates directly with card issuer system 630. Card translator 650 may be accessed by all systems, client systems 610 and 640, card processor 620 and card issuer 630, to retrieve card account numbers, and lock/unlock card records by providing a Supracard number and index.

The present system and method substantially reduces the number of cards that a cardholder must carry by using a multi-application Supracard 205. Because the index is the primary limitation of the number of cards included in a cardholder record, a substantial number of cards currently carried may be reduced. In addition, the versatility of using either a standard card or bar code reader further demonstrates the widespread applicability. Moreover, the locking feature of the Supracard substantially improves a consumer's security risks, especially in retail settings. Finally, the accessibility of the cardholder's record,further allows quick resolution in case the card is lost.

In view of the foregoing, it will be appreciated that present invention provides a method and system for increasing the security of card-based transactions using a multi-application card to access card issuers. It should be understood that the foregoing relates only to the exemplary embodiments of the present invention, and that numerous changes may be made therein without departing from the spirit and scope of the invention as defined by the following claims.

The invention claimed is:

1. A system allowing a single card device to be utilized in accessing a plurality of applications, the system comprising:
   a) a card processing system;
   b) a card reader communicatively coupleable to the card processing system, the card reader being operative to read a data identification number from the single card device and to receive an index number selected by a user of the card device through a data interface;
   c) the processing system, in response to receiving the data identification number and said index number from the card reader, being operative to:
      i. identify an account number associated with the data identification number and said index number when the index number is within a first subset of index numbers chosen by an authorized holder of the card device from a domain of potential index numbers;
      ii. disable the card device from further use when the index number is within a second subset of index numbers chosen by the authorized holder of the card device from the domain of potential index numbers; and
      iii. re-enable a disabled card device when the index number is within a third subset of index numbers chosen by the authorized holder from the domain of potential index numbers.

2. A method allowing a single card device to be utilized in accessing a plurality of applications, the method comprising the steps of:
   a) reading a data identification number from the single card device;
   b) receiving an index number selected by a user of the card device through a data interface;
   c) identifying an account number associated with the data identification number and said index number when the index number is within a first subset of index numbers chosen by an authorized holder of the card device from a domain of potential index numbers;
   d) disabling the card device from further use when the index number is within a second subset of index numbers chosen by said authorized holder of the card device from the domain of potential index numbers; and
   e) re-enabling a disabled card device when the index number is within a third subset of index numbers chosen by said authorized holder from the domain of potential index numbers.

* * * * *

UNITED STATES PATENT AND TRADEMARK OFFICE
CERTIFICATE OF CORRECTION

PATENT NO.      : 6,494,367 B1
DATED           : December 17, 2002
INVENTOR(S)     : Ajit K. Zacharias It is certified that error appears in the above-identified patent and that said Letters Patent is hereby corrected as shown below:

<u>Title page,</u>
Item [76], Inventor's address should read as follows:

-- 32 Merlin Drive
   Brampton ON L6P 1G1
   Canada --

Signed and Sealed this

Twenty-ninth Day of July, 2003

JAMES E. ROGAN
*Director of the United States Patent and Trademark Office*